(12) United States Patent
Colson

(10) Patent No.: US 6,330,518 B1
(45) Date of Patent: Dec. 11, 2001

(54) METHOD AND APPARATUS FOR ASSEMBLING CUSTOM COMPLIANCE TESTS FOR CONFIGURABLE SPECIFICATIONS

(75) Inventor: James Campbell Colson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,495

(22) Filed: Jan. 29, 1999

(51) Int. Cl.[7] ............................ G01M 19/00; G06F 19/00
(52) U.S. Cl. ............................ 702/123; 703/27; 707/9
(58) Field of Search ............................... 702/123; 717/1; 707/9; 703/27

(56) References Cited

U.S. PATENT DOCUMENTS 5,579,509 * 11/1996 Furtney et al. ........................ 703/27
5,659,788 * 8/1997 Someya et al. ........................ 703/27
6,182,245 * 1/2001 Akin et al. ............................ 714/38

* cited by examiner

Primary Examiner—Marc S. Hoff
Assistant Examiner—Demetrius Pretlow
(74) Attorney, Agent, or Firm—Duke W. Yee; Charles D. Stepps, Jr.; Leslie Van Leeuwen

(57) ABSTRACT

A process for building a platform compliance test for only software components necessary to an application is disclosed. Initially the application is parsed to reveal only component needed for performance of the application, those components names are then checked against components names which are available to the application. A compliance test consisting of compatibility tests associated with the available components is then generated and used to evaluate platforms in which the application is intended to be developed.

10 Claims, 4 Drawing Sheets

METHOD AND APPARATUS FOR ASSEMBLING CUSTOM COMPLIANCE TESTS FOR CONFIGURABLE SPECIFICATIONS

BACKGROUND OF THE INVENTION

1. Technical Field

The present invention relates to a method and apparatus for checking compliance of application components with the application domain in which the application is intended to be developed on. More specifically, the present invention relates to a method and apparatus for implementing a suite of compatibility test associated with components used by an application. Still more particularly, the present invention relates to a method for identifying only the necessary components needed for an application and the best possible compatibility test for each of the components.

2. Description of Related Art

Object oriented technology allows for very good componentization of software elements. This lends a high degree of configurability to systems that are built out of these components. As application domains become defined, standard collections of components can be created to form "platforms". A platform connotes the existence of a well-defined collection of components that others can use for application development. For instance, businness JAVA™ is a platform that contains a great deal of JAVA™ components, which are expected to always be available. To ensure that these components are available and that they behave correctly a compatibility test suite can be created. This suite typically implements a set of applications that exercise the components associate with the platform. If the test suite passes then the components have shown to exist and behave correctly.

A more heterogeneous environment, such as embedded devices, poses some problems with this platform approach. The desire is to still use object oriented technology (in fact it poses some real advantages in this space) and define a set of components that address the wide variety of heterogeneous requirements. This implies that there may be a large collection of platforms to address the heterogeneity. A complication arises from this. A single compliance test is no longer possible.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

JAVA™ is an object oriented programming language and environment focusing on defining data as objects and the methods that may be applied to those objects. JAVA™ supports only a single inheritance, meaning that each class can inherit from only one other class at any given time. JAVA™ also allows for the creation of totally abstract classes known as interfaces, which allow the defining of methods that may be shared with several classes without regard for how other classes are handling the methods. JAVA™ provides a mechanism to distribute software and extends the capabilities of a Web browser because programmers can write an applet once and the applet can be run on any Java enabled machine on the Web.

The JAVA™ virtual machine (JVM) is a virtual computer component that resides only in memory. The JVM allows JAVA™ programs to be executed on different platforms as opposed to only the one platform for which the code was compiled. JAVA™ programs are compiled for the JVM. In this manner JAVA™ is able to support applications for many types of data processing systems, which may contain a variety of central processing units and operating systems architectures.

A development environment, such as the JAVA™ Development Kit (JDK) available from Sun Microsystems, Inc., may be used to build JAVA™ byte code from JAVA™ language source code and libraries. A JAVA™ Compliance Kit (JCK), may ported to an environment to check the compliance, or compatibility, of that environment with the libraries and codes available in JAVA™. However other JAVA™ platforms contain only a subset of all JAVA™ libraries and codes contained in the JDK. Therefore, it cannot be assumed that if a specific environment passes the compliance test for the JDK, that components in an application developed for that specific environment will behave. It can only be assumed that the components will behave in the environment which includes all JAVA™ libraries.

Figure 1:
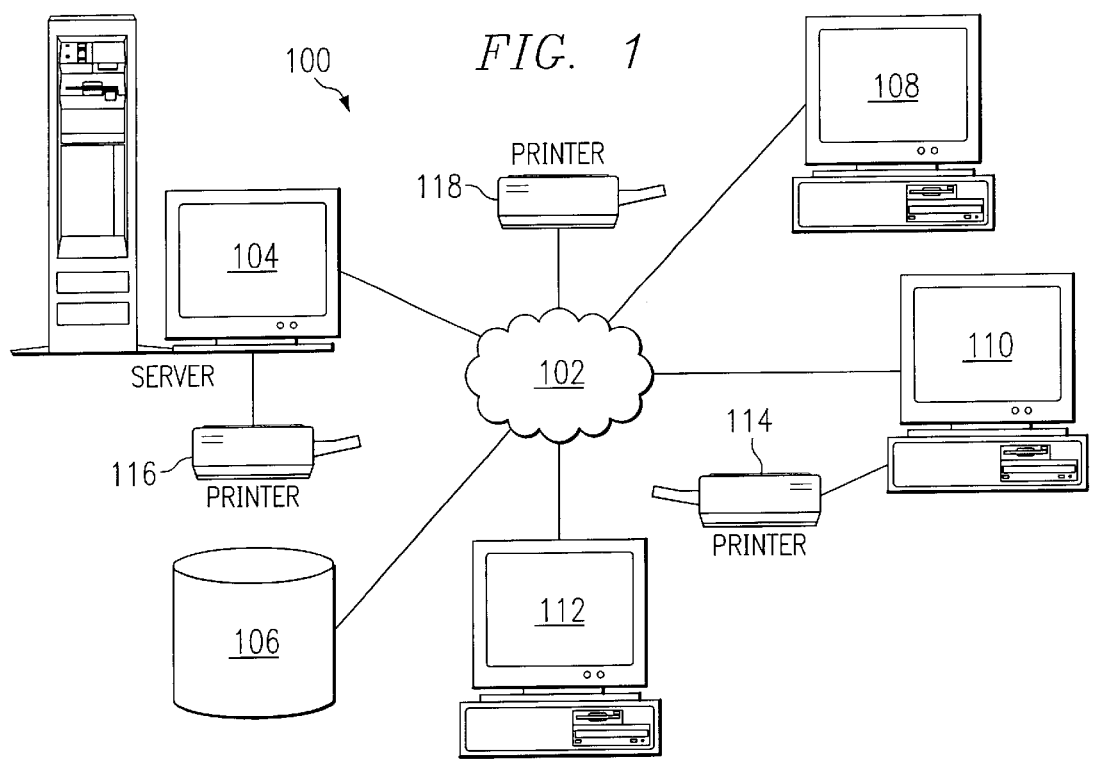
FIG. 1 a pictorial representation of a distributed data processing system in which the present invention may be implemented is depicted.

With reference now to the figures, and in particular with reference to FIG. 1, a pictorial representation of d distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108, 110, and-112. Clients 108, 110, and 112 are clients to server 104. Distributed data processing system 100 may include additional servers, clients, and other devices not shown. A number of different platforms may exist on clients 108, 110, and 112. JAVA™ applications may need to be developed with an eye to the fact that they may be embedded or applied to these different platforms on the clients. These applications may be developed on a client or server for distributions to other clients within distributed data processing system. In the depicted example, distrbuted data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
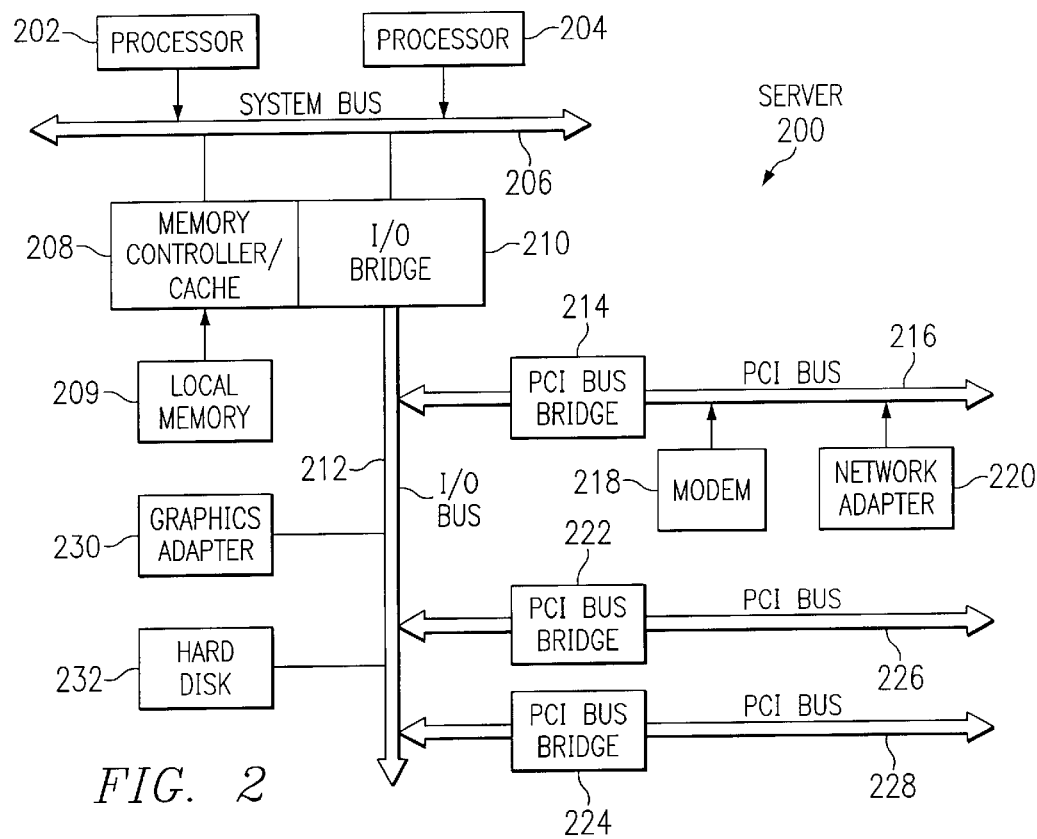
FIG. 2 illustrates a block diagram of a data processing system which may be implemented as a server.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218 may be connected to PCI bus 216. Typical PCI bus implementations will support four PCI expansion slots or add-in connectors. Communications links to network computers 108, 110 and 112 in FIG. 1 maybe provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
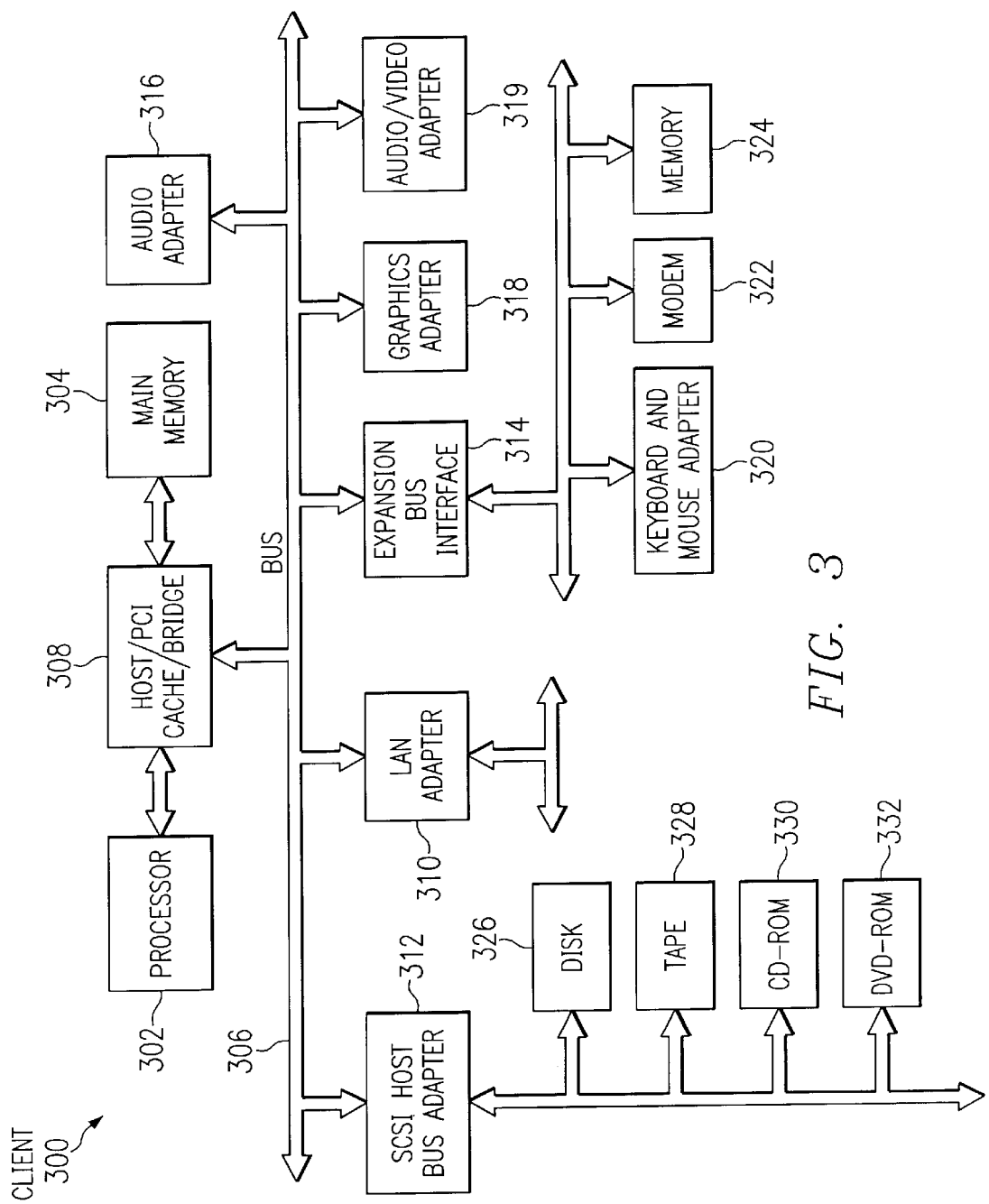
FIG. 3 depicts a block diagram of a data processing system in which the present invention may be implemented is illustrated.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 329, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system maybe a commercially available operating system such as OS/2™, which is available from International Business Machines Corporation. "OS/2" is a trademark of from International Business Machines Corporation. An object oriented programming system such as JAVA™ may run in conjunction with the operating system and provides calls to the operating system from JAVA™ programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

Object oriented technology allows for a very good componentization of software components. This lends a high degree of configurability to systems that are built out of these components. As application domains become more defined, standard collections of components can be created to form "platforms". Platforms are the existence of a well-defined collection of components that others can use for application development. For instance, Business JAVA™ is a platform that contains a great deal of JAVA™ components that are expected to always be available. To ensure that these components are available and behave correctly, a compatibility test suite can be created. This test suite typically implements a set of applications that exercise the components associated with the platform. If the test suite passes, then the components have been shown to exist and behave correctly. A method for building this compliance test suite will be described in conjunction with the Figures below.

Figure 4:
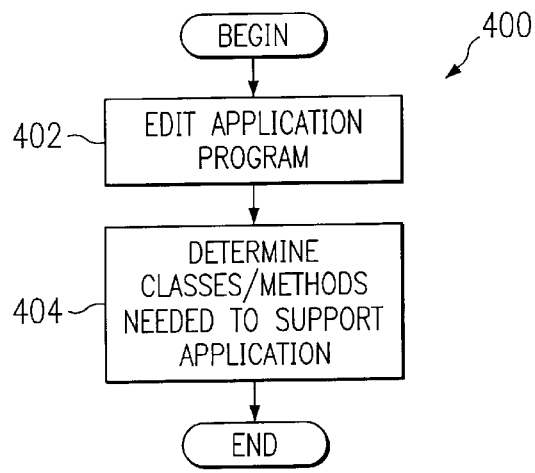
FIG. 4 illustrates a process for editing an application requiring one or more classes to be supported by an application.

FIG. 4 illustrates a process for editing an application requiring one or more classes to be supported by an application. The process begins with the developer editing an application program (step 402). While this step depicts the developer editing the program, the developer may very well create a program from scratch. However, applications tend to evolve in response to both the utilization of the application and the technology or environment in which the application is intended to perform. The application program may contain a series of classes and methods for implementing the application. These class or method components might be written into the application or called from a component library of a platform. Certain components become essential for any application within a field. These components become so routinely used that they are eventually supported by the platform in which the application is intended to be run. At that point, the developer can merely insert calls within the application to call the components from the platform. Thus, the program does not need to contain the classes or methods, but merely call the classes and methods from a library in the platform the application is intended to run on. Therefore, the program developer must determine which classes and methods are needed to support the application (step 404). In other words, which components are actually invoked in the application, rather than merely being mentioned in the program code.

Once the programmer has edited the application, such as described in FIG. 4, or may be accomplished by using any commercially available program editor, the programmer must somehow test the platform for compatibility with the edited program. As noted above, checking compatibility with the JCK is unacceptable when the development environment contains only a subset of all Java libraries contained in the JDK. A development platform, such as an embedded platform, simply cannot be assumed to be compatible with every component in Java whilst it contains only a portion of all Java libraries.

Figure 5:
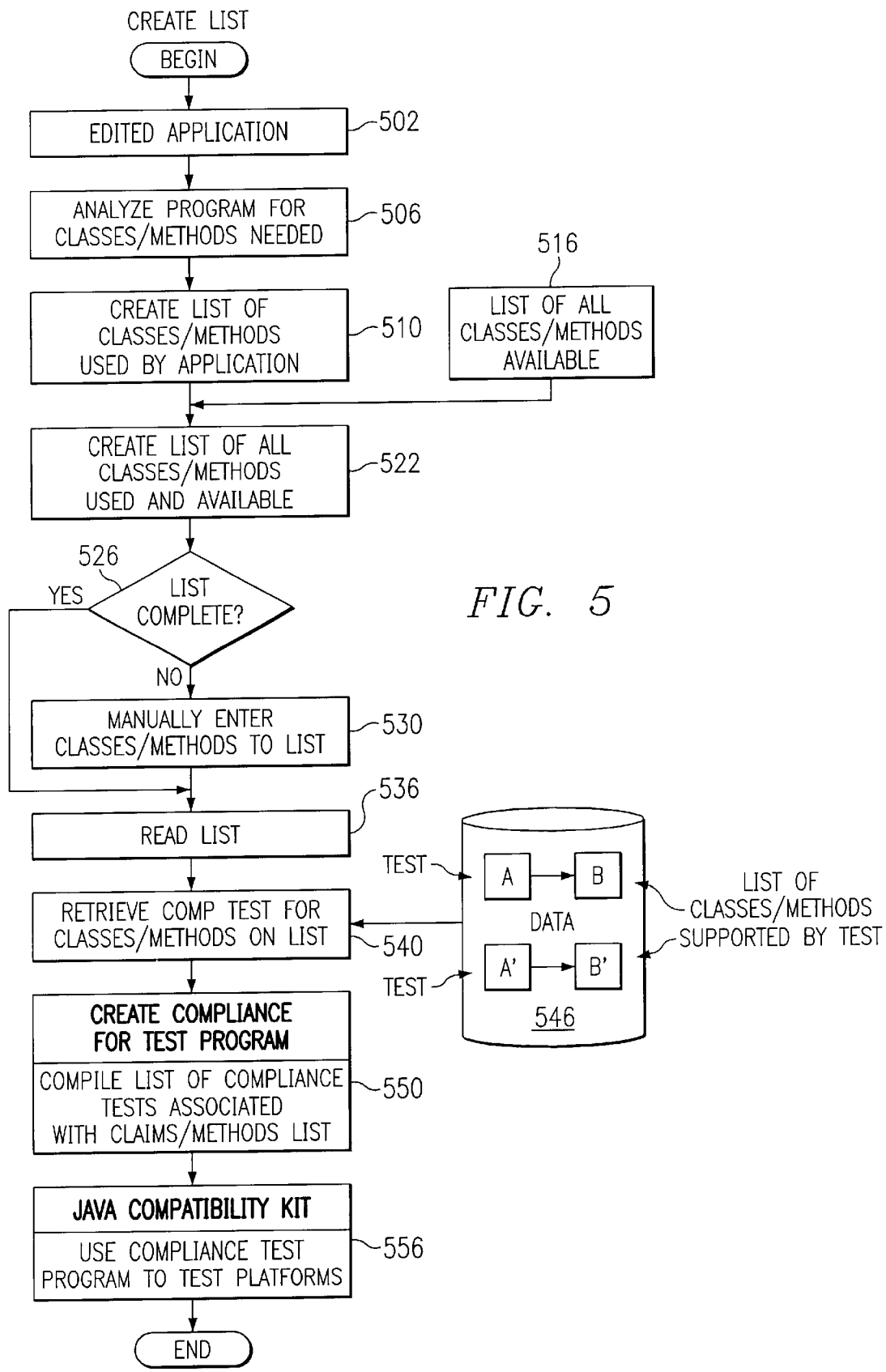
FIG. 5 illustrate a process for creating a custom compliance test for testing the compatibility of platforms in which applications are intended to be run.

FIG. 5 illustrates a process for creating a custom compliance test for testing the compatibility of platforms in which applications are intended to be developed. The process proceeds in two major processes. The first process, depicted by FIG. 5, is for creating a list of classes and methods which are needed to run the program. The second process, depicted in FIG. 5, is for creating a custom compliance test which test only the components in the platforms needed for developing the application, by using the list of classes and methods created in the process depicted in FIG. 5.

The process for creating a list begins with the edited application (step 502). It should be noted again that the application need not be an application edited by a developer but might be any application intended to be developed on a platform which contains less than the full complement of libraries available from the JDK.

A static analyzer program is used to parse the application for identifying only the classes and methods needed for successfully running the application (step 506). Analyzer programs, such as JAVA Check™, can be used to parse an application program looking for all methods of classes that are actually used and not just included in the application itself (step 510). A list of all classes and methods used in the application program is then created. Next, the analyzer program accesses a full list of all classes and methods which are available to the application. While this full list of components might be available from the full JAVA™ development kit (JDK), the full list of available components might merely be a subset. For instance, developers in a specific technical field may have a pre-defined set of classes and methods which are supported by the normal platforms in which their applications are intended to run. In that case, the full list of available classes might be a library included in a platform such as embedded JAVA™, "eJAVA™", which is merely a subclass of all libraries contained in the JDK (step 516).

The analyzed program then creates a list of only the classes and methods which are both used by the application program, and available from the full list of classes and methods (step 522). At this point, the programmer determines if the list components which are run by the application and available to the application is complete (step 526). In some cases the programmer realizes that certain classes and methods needed by the application are not deducible by the static analyzer program. In that case the list is not complete. If the list is not complete, many static application analysis programs provide provisions, which allow the programmer to add classes and methods that are not deducible by the static application analysis program itself. Therefore the programmer can manually enter classes and methods to the list (step 530).

The resultant list can then be used as input to a custom compliance test generator which ensure compliance with a platform for developing a specific application by selecting compatibility tests associated with classes and methods that actually exist and are used by the application. FIG. 5 illustrates a process of building that custom compliance test program. Initially, the list compiled in the above-described process is read by a custom test builder application (step 536).

Using input of the list of classes and methods, the test builder then retrieves compatibility tests associated with the classes and methods on the list of used and available components (step 540). These compatibility tests may be as fine-grained as necessary. For instance, there might be a test associated with all methods in each class in a package. Each class may have an associated compatibility test in the database 546. However, it might be that groups of classes must be supported by a single test. In other cases, the compatibility test associated with a class may not exist or single class compatibility test may be impossible to implement because of the class's reliance on other classes. In that case, an alternative would be testing the class at a package level. In this vein, it is important to note that certain compatibility tests associated with well used packages might be automatically retrieved for every list. For instance, .IO, .LNG, and .UTIL packages may be needed for virtually every application and therefore compatibility tests associated with each one of these packages might be retrieved automatically in step 540. However, it is important to note that if no direct match between a class and a compatibility test can be establish, a selection should be made to cover all classes and methods that are actually in the application and the compatibility test generator can inform the resulting compatibility test on what is expected to fail. The level of the test must be scoped upward to insure compliance with the platform.

Having the list of compatibility tests associated with the classes and methods needed for the application, compliance test generator can then generate a compliance test program (step 550). Essentially the test program compiles a list of compatibility tests associated with the classes and methods on the list. At thin point the custom Java compliance test kit is complete. The test program can then be used to test platforms for compatibility with the application.

Figure 6:
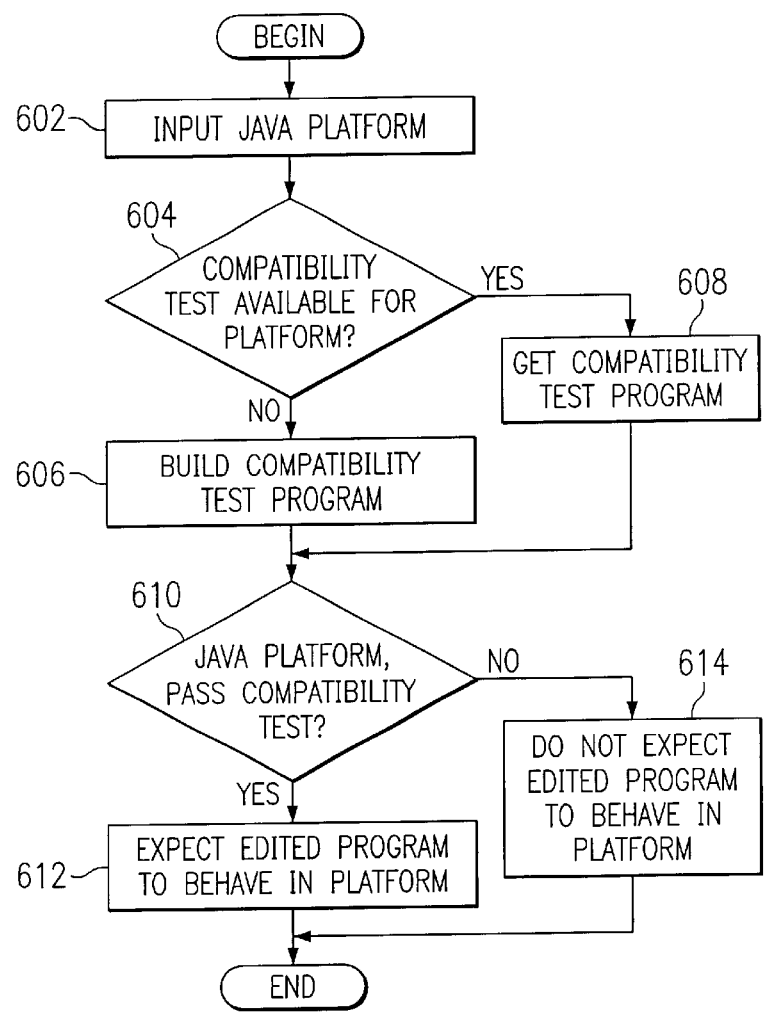
FIG. 6 illustrates the method for testing platforms for compliance with the applications intended to run on them.

FIG. 6 illustrates the method for testing platforms for compliance with the applications intended to run on them. The process begins when a JAVA™ platform is selected to be tested (step 602). Next a check is made for availability of a suitable custom compliance test for the platform (step 604). If no compliance test is available, a compliance test can be built as described above with respect to FIG. 5 (step 606). If, however, a test is available, the compliance test program is acquired for testing the platform (step 608). The custom compliance test can then be used to test the JAVA™ platform, for which the application is intended to be run (step 610). If the JAVA™ platform passes the compatibility test, programmer can expect the application to behave in a selected platform (step 612). If, on the other hand, the JAVA™ platform fails the compatibility test, the programmer cannot expect the edited program to behave well in the platform (step 614). At this point, the programmer may be required to edit the program to provide support for the classes or methods, which are not compatible under the selected platform.

For example, although the depicted embodiment is directed towards processing classes and methods in Java, the processes of the present invention may be applied to other programming languages and environments that process instructions, which are nonspecific to a computer on which the instructions are to be executed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for assembling a compliance test for testing domains of library components, comprising:

parsing an application for at least one component included in the application;

determining if the at least one component is invoked by the application;

on the basis of the component being invoked, determining if the at least one component is available;

on the basis of the invoked component being available, determining if a compatibility test exists for the available component; and on the basis of the existence of the compatibility test, including the compatibility test in the compliance test.

2. The method recited in claim 1, wherein the component is one of a method, a class and a package.

3. The method recited in claim 1, wherein the method, class and package are JAVA™ compatible.

4. A method for assembling a compliance test for testing domains of library components, the method comprising:

creating a first list including at least one component associated with an application;

creating a second list of components available to the application;

selecting a compatibility test for any component included in the first list and included in the second list; and including the selected compatibility test in a compliance test.

5. A data processing system for assembling a compliance test for testing domains of library components, the system comprising:

parsing means for parsing an application for at least one component included in the application;

determining means for determining if the at least one component is invoked by the application;

determining means for determining if the at least one component is available; determining means for determining if a compatibility test exists for the available component; and including means for including the compatibility test in the compliance test.

6. A data processing system recited in claim 5, wherein the component is one of a method, a class and a package.

7. A data processing system recited in claim 5, wherein the method, class and package are JAVA™ compatible.

8. A data processing system for assembling a compliance test for testing domains of library components, the system comprising:

creating means for creating a first list including at least one component associated with an application;

creating means for creating a second list of components available to the application;

selecting means for selecting a compatibility test for any component included in the first list and included in the second list; and including means for including the selected compatibility test in a compliance test.

9. A software program product implemented on a processor readable medium including instruction performed on a data processing for assembling a compliance test for testing domains of library components, the instructions comprising:

instructions for parsing an application for at least one component included in the application;

instructions for determining if the at least one component is invoked by the application;

on the basis of the component being invoked, instructions for determining if the at least one component is available;

on the basis of the invoked component being available, instructions for determining if a compatibility test exist for the available component; and on the basis of the existence of the compatibility test, instructions for including the compatibility test in the compliance test.

10. A software program product implemented on a processor readable medium including instruction performed on a data processing for assembling a compliance test for testing domains of library components, the instructions comprising:

instructions for creating a first list including at least one component associated with an application;

instructions for creating a second lit of components available to the application;

instructions for selecting a compatibility test for any component included in the first list and included in the second list; and instructions for including the selected compatibility test in a compliance test.

* * * * *

UNITED STATES PATENT AND TRADEMARK OFFICE
CERTIFICATE OF CORRECTION

PATENT NO. : 6,330,518 B1
DATED : December 11, 2001
INVENTOR(S) : Colson

It is certified that error appears in the above-identified patent and that said Letters Patent is hereby corrected as shown below:

Column 1,
Line 43, the following paragraph was omitted from the specification. Please double space and insert after "possible."
-- SUMMARY OF THE INVENTION
A process for building a platform compliance test for only software components necessary to an application is disclosed. Initially the application is parsed to reveal only component needed for performance of the application, those components names are then checked against components names which are available to the application. A compliance test consisting of compatibility tests associated with the available components is then generated and used to evaluate platforms in which the application is intended to be developed. --;

Column 2,
Line 44, after "representation of" delete "d" and insert -- a --;
Line 66, after the first "clients 108, 110 and" delete "-112" and insert -- 112 --;

Column 3,
Line 17, after "implemented as" delete "an umber" and insert -- a number --;

Column 6,
Line 46, after "can be" delete "establish" and insert -- established --;

Column 8,
Line 44, after "test" delete "exist" and insert -- exists --;
Line 56, after "second" delete "lit" and insert -- list --.

Signed and Sealed this

Thirtieth Day of July, 2002

*Attest:*

*Attesting Officer*

JAMES E. ROGAN
*Director of the United States Patent and Trademark Office*